United States Patent [19]

Everett

[11] Patent Number: 4,667,098

[45] Date of Patent: May 19, 1987

[54] MULTI-TRACK OPTICAL SHAFT POSITION AND TIMING CYLINDER

[75] Inventor: Seth L. Everett, Lincroft, N.J.

[73] Assignee: The United States of America as represented by the Secretary of the Army, Washington, D.C.

[21] Appl. No.: 717,990

[22] Filed: Mar. 29, 1985

[51] Int. Cl.$^4$ .............................................. G01D 5/34
[52] U.S. Cl. ......................... 250/231 SE; 250/237 G
[58] Field of Search .................. 250/231 SE, 237 G; 340/347 P; 356/395; 324/175

[56] References Cited

U.S. PATENT DOCUMENTS

| | | | |
|---|---|---|---|
| 3,540,040 | 11/1970 | Sheane | 340/347 P |
| 3,558,861 | 1/1971 | Collins et al. | 340/347 P |
| 3,942,619 | 3/1976 | Nordstrom et al. | 400/119 |
| 4,024,941 | 5/1977 | Seklkawa et al. | 400/124 |
| 4,172,994 | 10/1979 | Bergkvist | 250/237 G |
| 4,289,983 | 10/1981 | Bengnar et al. | 310/49 R |
| 4,376,585 | 3/1983 | Fromme et al. | 400/185 |
| 4,429,268 | 1/1984 | Yajima et al. | 318/696 |
| 4,437,098 | 3/1984 | Rosinek et al. | 250/231 SE |
| 4,465,959 | 8/1984 | Yajima | 318/696 |
| 4,544,915 | 10/1985 | Wieme et al. | 340/347 P |

Primary Examiner—David C. Nelms
Assistant Examiner—S. Allen
Attorney, Agent, or Firm—Sheldon Kanars; Jeremiah G. Murray; Paul A. Fattibene

[57] ABSTRACT

A shaft position, direction and timing assembly for a stepper motor in an electrically controlled printing system operating in an environment subjected to relatively strong vibrational and shock levels is disclosed. A cylindrical coding member having one or more photo-optical coding tracks located adjacent one edge is mounted on the stepper motor shaft by being held in position by an inner support cylinder and an outer retaining collar. These three elements are commonly fastened to the stepper motor shaft by a pair of mutually opposing set screws. Photo emitter and receptor elements contained in a bifurcated subassembly are located at the edge of the cylindrical coding so as to oppose a coding pattern formed on the coding tracks for generating an electrical signal in response to the coding pattern acting to pass or interrupt light energy transmitted from the emitter to the receptor elements.

14 Claims, 6 Drawing Figures

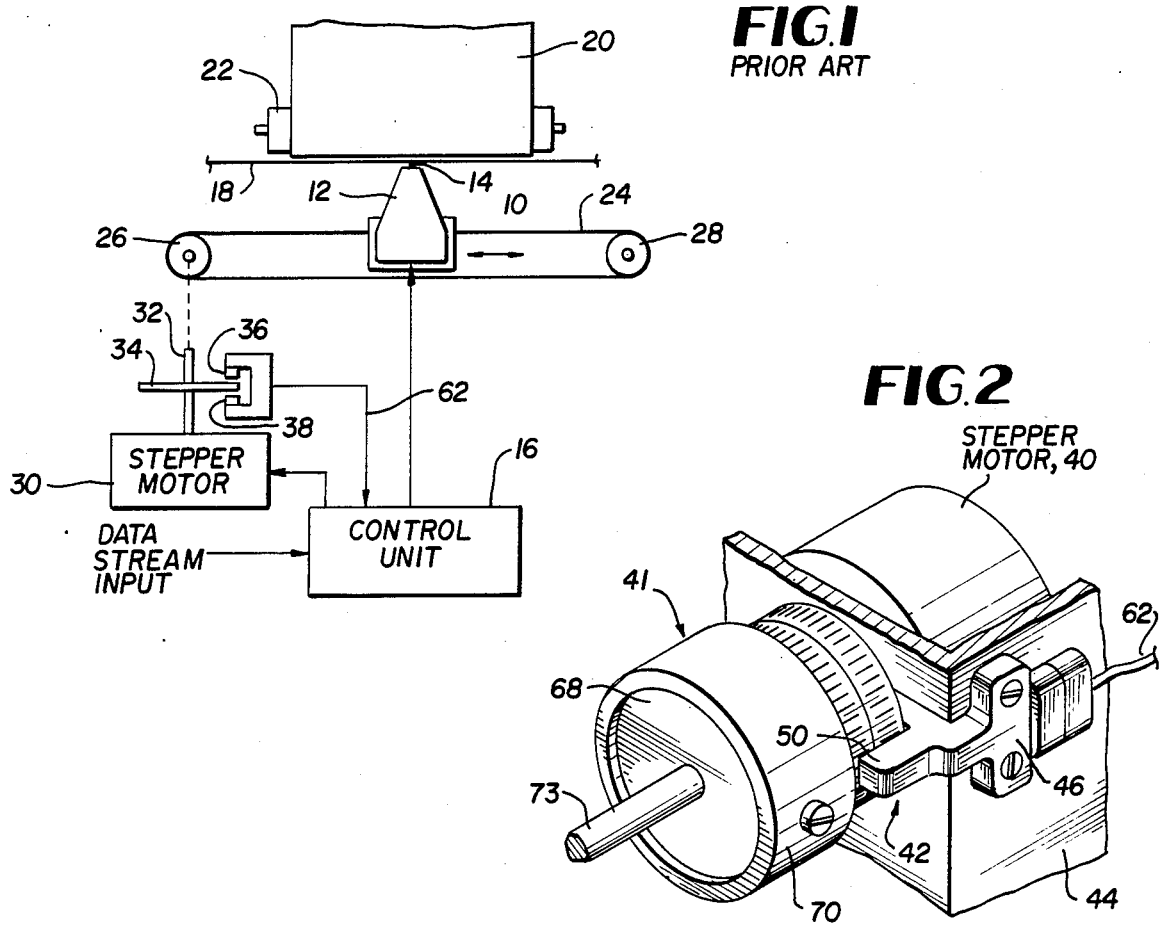
FIG.1 PRIOR ART
FIG.2
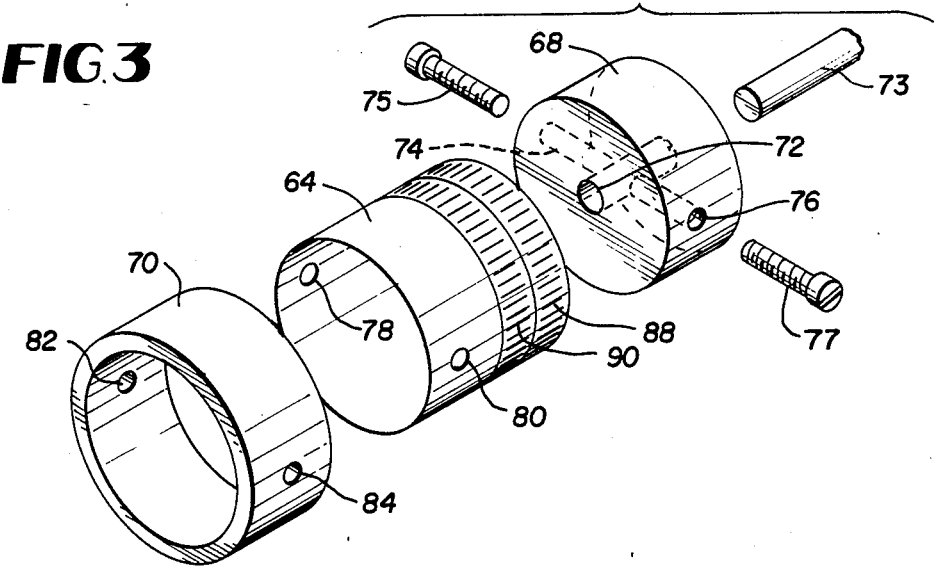
FIG.3

MULTI-TRACK OPTICAL SHAFT POSITION AND TIMING CYLINDER

This invention may be manufactured and used by or for the Government for governmental purposes without the payment of any royalties thereon or therefor.

BACKGROUND OF THE INVENTION

1. Field of the Invention

This invention relates generally to optical encoders and more particularly to optical encoders utilized in connection with stepper motors which control high speed printers.

2. Description of the Prior Art

As is well known, carriage mounted print heads for dot matrix printers are controlled by stepper motors which in turn are controlled by a closed loop feedback systesm including a flat disk type of slotted code wheel or printed film strip having a source of light on one side of the disk and a photosensor on the other side for detecting the absence or presence of a slot or other indicia by the sensing of transmitted light between the emitter and sensor. Shaft position, direction and/or timing information in the form of an electrical pulse train is provided for controlling the stepper motor and accordingly the position of the print head.

While a rotational encoder utilized in connection with a stepper motor is disclosed in U.S. Pat. No. 4,289,983, entitled, "Encoder For Monitoring Bidirectional Motion", which issued to L. Bengner, et al. on Sept. 15, 1981, impact type printers utilizing such apparatus are additionally typically disclosed in the following references: U.S. Pat. No. 3,942,619, entitled, "Printer Employing Stylus Correlation and Motor Damping Means", which issued to L. Nordstrom, et al. on Mar. 9, 1976; U.S. Pat. No. 4,024,941, entitled, "Dot Matrix Type Serial Printer", which issued to A. Sekikawa, et al. on May 24, 1977; U.S. Pat. No. 4,376,585, entitled, "Combined Paper Advance and Ink Ribbon Feed System", which issued to L. Fromme, et al. on Mar. 15, 1983; U.S. Pat. No. 4,429,268, entitled, "Speed Control for Step Motors", which issued to T. Yajima, et al. on Jan. 31, 1984; and U.S. Pat. No. 4,465,959, entitled, "Step Motor Drive Control", which issued to T. Yajima on Aug. 14, 1984.

Accordingly, it is an object of the present invention to provide an improvement in electrically controlled printing apparatus.

It is another object of the invention to provide an improved optical encoder capable of sensing motor shaft position and direction as well as providing timing information for controlling a carriage mounted print head.

It is a further object of the invention to provide an improved optical encoder for printer control circuitry and which is adapted to provide reliable information while operating in a harsh environment.

And it is still a further object of the invention to provide an improved rotational encoder which is adapted to provide reliable and precise information as to motor shaft position and/or direction as well as timing information while operating in the presence of strong shock or vibration levels which ordinarily would curtail operation of electrically controlled dot matrix printers.

SUMMARY

Briefly, the foregoing and other objects of the invention are achieved by means of a multi-track optical shaft position sensing assembly secured to the shaft of a stepper motor controlling the print head carriage of an impact type printer which is designed to operate in harsh environments. The assembly includes an optical cylindrical coding member having one or more parallel circumferential coding tracks located adjacent one edge and including an optical coding pattern of light transmitting and blocking means for providing shaft position, direction and timing information to stepper motor control circuitry. The coding cylinder is located intermediate a substantially solid inner support cylinder and an outer retaining collar. These elements are furthermore held in place on the shaft of the stepper motor by a pair of mutually opposing set screws. Photo emitter and receptor pairs are mounted in a bifurcated subassembly which surrounds the outer edge of the encoder cylinder at the location of the coding tracks in order to generate electrical signals in response to the coding pattern passing or blocking the transmission of light between a photo emitter and an opposing receptor.

BRIEF DESCRIPTION OF THE DRAWINGS

While the present invention is defined in the claims annexed to and forming a part of this specification, a better understanding can be had by reference to the following description when taken in conjunction with the accompanying drawings in which:

FIG. 1 is a block diagram partially illustrative of known prior art apparatus;

FIG. 2 is a perspective view of the preferred embodiment of the invention;

FIG. 3 is an exploded perspective view of the components of the preferred embodiment shown in FIG. 2;

DESCRIPTION OF THE PREFERRED EMBODIMENT

Figure 4:
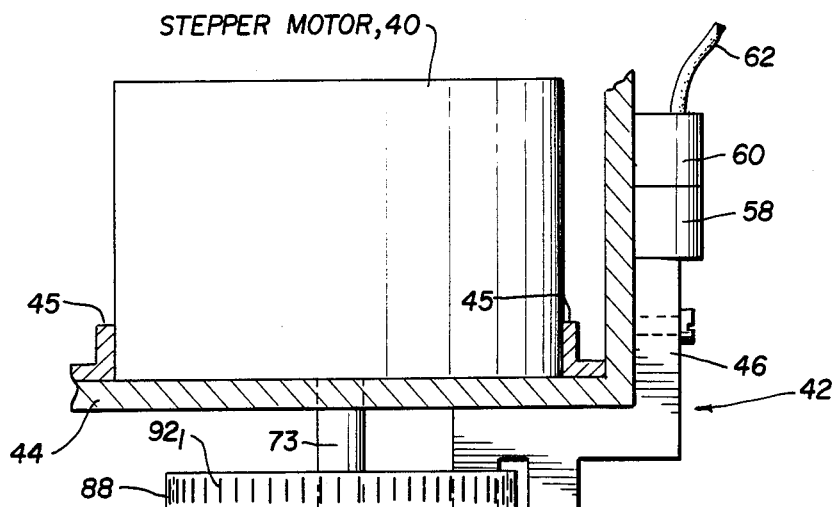
FIG. 4 is a top plan view further illustrative of the embodiment shown in FIG. 2.

Referring now to the drawings and more particularly to FIG. 1, disclosed thereat is a block diagram partially illustrative of an impact type of electrically controlled printing system in accordance with the known prior art. As shown, reference numeral 10 designates a carriage on which is mounted a print head 12, which may be, for example, a dot matrix print head including a plurality of print wires 14 which when activated in response to a character or symbol generation signal from a control unit 16 causes a print ribbon 18 to be forced against the face of a printing medium 20. The printing medium 20 consists, for example, of a sheet of paper or the like which is moved by means of a platen or roller 22. The roller 22 is normally rotated in accordance with a rotational drive motor, not shown, in a conventional fashion.

The carriage 10, moreover, is translated back and forth by means of a belt or other similar apparatus 24 wound around a pair of pulleys 26 and 28. The pulley 26, for example, is mechanically coupled to and rotatably driven by a stepper motor 30 whose shaft 32 is mechanically coupled to the pulley 26. Positioning and timing information concerning the rotary movement of the shaft 32 is typically provided in the known prior art apparatus by a circular disk 34 which has a coding pattern, for example, in the form of one or more circular sets of slots which are adapted to transmit light between a photo emitter 36 and a photo receptor 38. An electrical signal is generated which is fed back to the control unit 16 to provide positioning and timing information. This information is used by the control unit 16 to thereafter control the stepper motor 30 in a well known closed loop feedback type of motor control system.

The present invention is directed to an improvement over known prior art encoder apparatus by providing a relatively simple and compact, yet rugged rotational encoder assembly which is capable of withstanding the relatively strong shock and vibrational operating environment which can be encountered in tactical military type printers, such as the AN/UGC-74 dot matrix printer. Referring now collectively to FIGS. 2, 3 and 4, the preferred embodiment of the invention comprises a shaft position, direction and timing assembly for a stepper motor 40, and including a timing cylinder subassembly 41 and a photo emitter/sensor subassembly 42.

Figure 5:
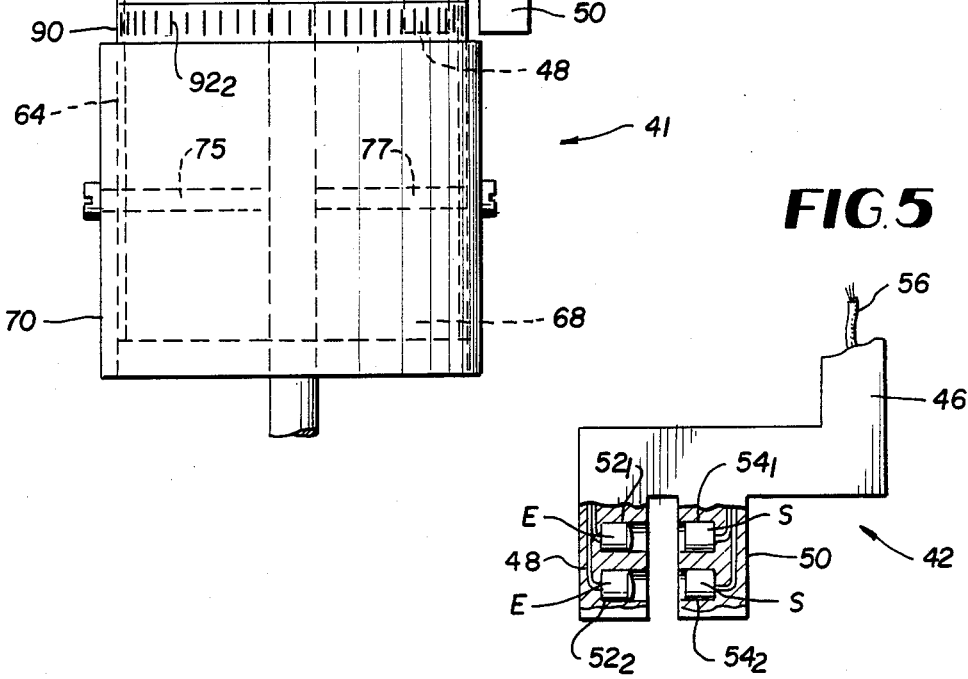
FIG. 5 is a partial cutaway view of the photooptical emitter and receptor subassembly included in the embodiment shown in FIGS. 2 and 4.

As shown in FIGS. 2 and 4, the stepper motor 40 is positioned next to and firmly affixed to a relatively strong support frame 44. It is held in a fixed position by mounting elements 45 (FIG. 4). The emitter/sensor subassembly 42 is fastened to the opposite side of the support frame 44 at the edge thereof by being configured in the form of an angulated bracket member 46 terminating in bifurcated end members 48 and 50 which are adapted to house, for example, two photo emitter elements $52_1$ and $52_2$ and two photo receptor elements $54_1$ and $54_2$, respectively, as shown in FIG. 5. Electrical wiring for the photo-optical emitter and sensor elements is included in a cable 56 which is fed through the bracket member 46 to an electrical connector consisting of mating sections 58 and 60 and which is coupled back to the control unit 16 shown in FIG. 1 by means of a multi-wire cable 62.

Figure 6:
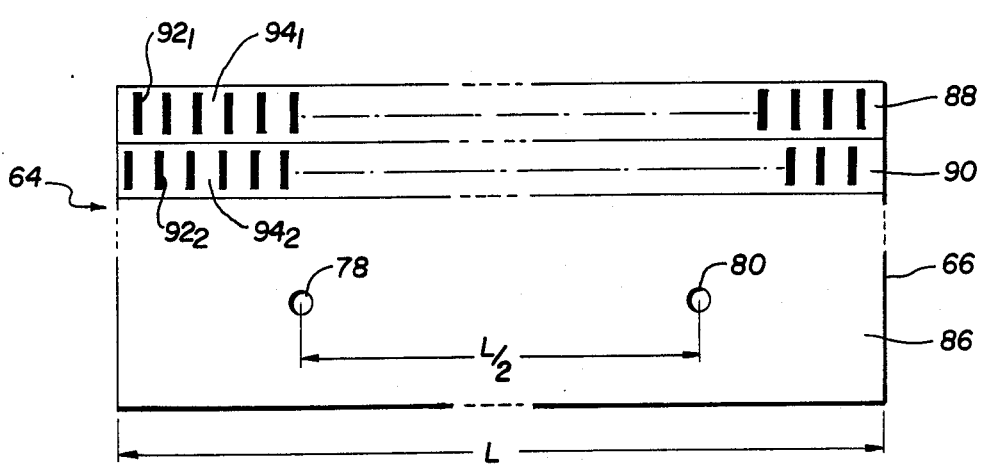
FIG. 6 is a top plan view of the cylindrical coding member shown in FIG. 4 when in a flattened state.

The improvement in the encoder lies primarily in the construction of the tiiming cylinder subassembly 41. It is comprised of three main components, namely, an optical coding member 64 which is configured in the form of a cylinder as shown in FIG. 3, but which is fashioned from a relatively thin, flat piece of flexible material 66, as shown in FIG. 6, and thereafter wound around a substantially solid support cylinder 68 and which is held in place thereon by means of a relatively thick retaining collar 70. The support cylinder 68 furthermore includes a central axial bore 72 for the passage of the stepper motor shaft 73 therethrough and two opposing transverse bores 74 and 76 for receiving a pair of set screws 75 and 77. The material 66 from which the coding member 64 is formed also includes a pair of holes 78 and 80 which oppose one another when wound into a cylindrical shape as shown in FIG. 3. The position of the holes 78 and 80 are also designed to line up with the bores 74 and 76 of the support cylinder 68 when it is inserted therein. The retaining collar 70 contains a similar pair of opposing holes 82 and 84 which are adapted to line up with the holes 78 and 80 and the bores 74 and 76 when the collar is placed over the coding member 64. Accordingly, the three component parts 64, 68 and 70 of the timing cylinder subassembly are fitted together as shown in FIG. 4 and secured to the shaft 73 by means of the set screws 75 and 77 to form a strong relatively balanced unit.

The support cylinder 68 and the retaining collar 70 may be composed of metal or of a suitable composition material. The coding member 64 as further shown in FIG. 6, is comprised of a piece of material 66 of a generally rectangular shape and which may be comprised of metal or a photographic film base material and is flexible so that it can be folded into the cylindrical shape 64. The piece of coding material 66 includes a relatively large rectangular body portion 86 which is adapted to cover the entire width dimension of the support cylinder 68. Additionally, it includes two adjoining elongated strip body portions 88 and 90 which comprise a pair of cicumferential optical coding tracks which project outwardly from the support cylinder 68 and the retaining collar 70 toward the stepper motor 40 as shown in FIG. 4 so as to rotatably pass between the bifurcated end members 48 and 50 of the emitter/sensor subassembly 42 containing the pairs of emitter/sensor elements $52_1$, $54_1$ and $52_2$, $54_2$ (FIG. 5). The two coding tracks 88 and 90 each contain coded information for generating position, direction and timing information concerning the rotation of the stepper motor shaft 73. If the coding element 64 is implemented in metal, the information can be encoded by means of punching or otherwise forming slots in the metal or material to permit light to travel between the emitter-sensor pairs in a conventional manner. If, on the other hand, the coding element 64 is formed of a photographic film base material, coding is provided by alternating light obstructing and light transmissive areas $92_1$ and $94_1$ for the track 90 and similar type areas $92_2$ and $94_2$ for the track 88. When desirable, the clear and dark areas are reversed. These areas, moreover, can easily be formed by well known graphics art techniques and appear to be the most cost effective and technically advantageous way to configure the optical coding elements in that the coding patterns may be precisely computer generated on photographic masters and then reduced to the dimensions required for the particular implementation.

It should also be pointed out that the coding areas $92_1$ and $92_2$ have a predetermined length dimension which is parallel to the motor shaft 73 as shown in FIG. 4. This dimension is chosen to be sufficient in length to permit a certain amount of "in-out" play of the stepper motor shaft 73 to eliminate any chance of the emitter-sensor subassembly 42 from providing a reading error due to this factor. Error caused by "wobble" of the motor shaft 73 due to the bearings of the stepper motor 40 is accounted for by the fact that the coding tracks 88 and 90 are oriented toward the motor 40 and due to the fact that the stepper motor 40 and the emitter/sensor subassembly 42 are mounted on the same support frame 44. Such a configuration inherently provides for precise operation under extreme mechanical shock and vibration conditions.

Although two tracks 88 and 90 containing separate optical coding patterns are shown in the preferred embodiment and which operate in concert with two pairs of photo emitter/sensor elements $52_1$, $54_1$ and $52_2$, $54_2$, a single emitter-sensor pair could be used if one timing-position code track were deemed sufficient for control purposes; however, on the other hand, three, four or even five timing tracks could be similarly implemented. Additionally, it is possible that a single "broad" photo emitter element could be utilized to flood several masked sensor elements.

Whereas conventional timing wheel designs have proven incapable of effectively performing the required task of providing information regarding the position and direction of a stepper motor utilized in electrically controlled printing systems subjected to high levels of shock and vibration, the present invention overcomes the inherent limitations of prior art apparatus by providing a ruggedized structure capable of meeting the requirements of the shaft position and timing apparatus for maintaining positive control of moving carriage dot matrix print heads operating in such environments.

Having disclosed what is at present considered to be the preferred embodiment of the invention, it should be noted that the same has been made by way of illustration and not limitation. Accordingly, all alterations, modifications and changes coming within the spirit and scope of the invention are herein meant to be included.

I claim:

1. Optical encoder apparatus for sensing predetermined parameters relating to the rotation of a shaft, comprising:

a cylindrical support member mounted on said shaft;

a coding member having a first and second portion, said first portion including at least one coding track having a predetermined coding pattern of surface areas which selectively pass and block light energy and projecting axially beyond one end of said cylindrical support member, and said second portion being positioned around and supported by the outer surface of said cylindrical support member;

retaining means for holding said coding member in place on said cylindrical support member; and at least one photo emitter element and at least one photo sensor element respectively located on either side of said coding track for directing light energy toward said coding track and sensing the light energy passing therethrough for generating an electrical signal which is thereby able to provide information as to shaft position and direction as well as timing information.

2. The apparatus as defined by claim 1 wherein said shaft comprises the shaft of a drive motor.

3. The apparatus as defined by claim 2 wherein said drive motor comprises a stepper motor for controlling the position of electrically controlled print means.

4. The apparatus as defined by claim 3 wherein said print means comprises a carriage mounted print head.

5. The apparatus as defined by claim 1 and additionally including means for fastening said cylindrical support member to said shaft.

6. The apparatus as defined by claim 1 wherein said support member comprises a substantially solid cylindrical body having a central axial bore therethrough for being mounted on said shaft.

7. The apparatus as defined by claim 6 wherein said coding member comprises a flexible member wrapped around the outer surface of said support member.

8. The apparatus as defined by claim 6 wherein said coding pattern comprises a set of said surface areas which are oriented substantially parallel with said shaft and having a predetermined length for compensating for any axial translation of said shaft.

9. The apparatus as defined by claim 6 and additionally including a pair of mutually opposing fastening elements transversely through said coding member, said retaining means, and said cylindrical support member for commonly fastening said coding member, said retaining means, and cylindrical support member together on said shaft.

10. The apparatus as defined by claim 1 wherein said at least one coding track is positioned toward said stepper motor.

11. The apparatus as defined by claim 10 wherein said at least one coding track includes two coding tracks.

12. The apparatus as defined by claim 1 and additionally including a support frame, and wherein said stepper motor and said at least one photo emitter element and said at least one photo electric sensor element are fixedly attached to said support frame.

13. The apparatus as defined by claim 12 and wherein said at least one photo emitter element and said at least one photo electric sensor element are contained in a bifurcated housing having first and second end portions located on either side of said first portion including said coding track.

14. The apparatus as defined by claim 13 wherein said at least one emitter element is located in said first end portion and said sensor element is located in said second end portion.

* * * * *